Feb. 20, 1945. J. WANELIK 2,369,875
BORING BAR
Filed July 24, 1943

INVENTOR,
John Wanelik.
BY
ATTORNEY.

Patented Feb. 20, 1945

2,369,875

UNITED STATES PATENT OFFICE 2,369,875

BORING BAR

John Wanelik, Clifton, N. J., assignor to M. J. Maguth & Son Machine Works, Carlstadt, N. J., a firm Application July 24, 1943, Serial No. 495,973

1 Claim. (Cl. 287—100)

In a known type of rotary implement or tool sometimes termed a "boring bar" and used in enlarging, for more or less of its length, the diameter of a previously formed hole the holder for the tool proper has been a one-piece shank or bar, the same being bored transversely of its longitudinal axis to receive the tool proper, which was held against displacement by a set-screw tapped into the shank. Adjustment in order to develop the hole to some predetermined diameter was possible only by retracting the set-screw to release the tool proper. In effecting fine adjustments the screw is retracted sufficiently to obtain but a sliding contact with the tool proper, which is then tapped lightly in the effort to set it. But absolute accuracy of adjustment was of course quite remote especially in the case of fine calibration, or was too much a matter of pure chance.

The object of this invention is to provide a tool of this type which can be adjusted with positive accuracy and quickly, and which will have a compact form, without inconvenient and annoying projections and which, though it comprises a plurality of parts, shall be exceedingly simple in construction and well adapted to assume the strains, stresses and shocks incident to its use.

Figure 1:
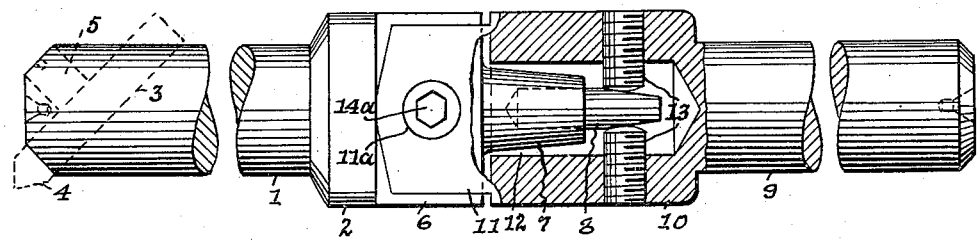
Figs. 1 and 2 are side elevations of the tool as viewed lengthwise and laterally of the pivot, the bore-including portion of one member (here the shank) appearing in section.

The tool-holding member comprises a bar portion 1 and a somewhat enlarged cylindrical portion or butt 2, the bar portion having the usual biased hole 3 to receive the tool 4, which is held fast by the set-screw 5. The butt 2 has a rearward flat centered projection 6 which terminates in a reduced tapered stud 7 coaxial with the bar portion 1 and which in this example, itself terminates in a hardened stem 8 which is preferably formed with opposed flat faces 8a; the faces 8a are in planes perpendicular to the faces of said projection 6.

The shank member comprises a bar portion 9, to be fitted to and secured in some rotary driver, and a cylindrical head portion 10 enlarged to the same diameter as the butt 2; such head has a pair of forward parallel projections 11 spaced apart a distance equal to the thickness of projection 6 of the tool-holding member, and the head is also formed with a recess 12, here in the form of a cylindrical bore of at least as great diameter as the base of the stud 7. With their common axis parallel with and in a plane midway between the planes of the inner faces of projections 11 a pair of opposed set-screws 13 are tapped into the head.

Figure 2:
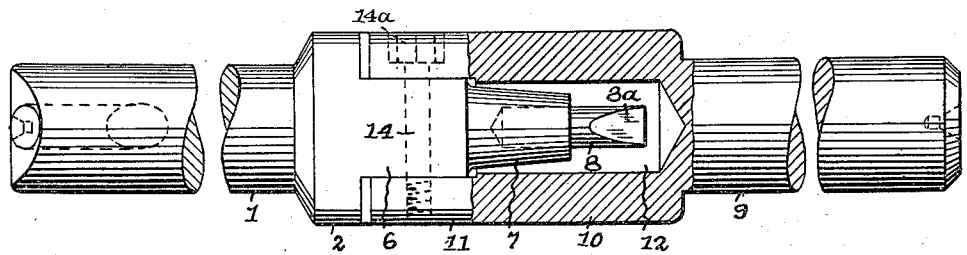

When the projection 6 of the tool-holding member has been entered between the projections 11 of the shank member as shown in Fig. 2 its stud 7 extends between set-screws 13, with its faces 8a presented thereto. As shown, the two members are in coaxial relation to each other, or alined.

The two members are pivoted together by a screw 14 having a hexagonal head 14a and which penetrates all three projections, its axis being perpendicular to the axis of the shank member. The screw is preferably tapped into one of the projections 11 but has a smooth or unthreaded fit with projection 6 and the other projection 11 whereby, having its head 14a preferably countersunk in a recess 11a of the latter projection, it serves to clamp all three projections together.

Figures 3, 5:
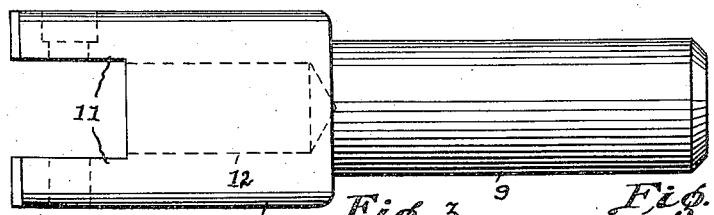
Figs. 3 and 4 are similar elevations of said members viewed the same as in Fig. 2.
Fig. 5 is an enlarged fragment of the tool as shown in Fig. 1 and showing the arcuate form at 15 of the projections 11.
Figure 4:
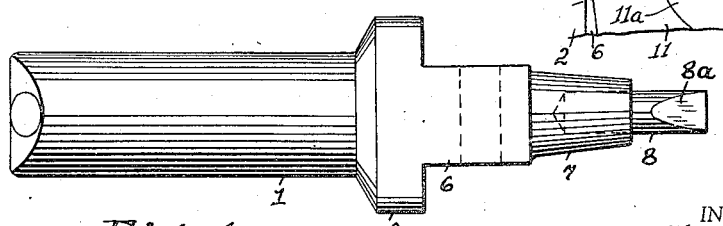

The free or forward ends of the projections 11, which terminate in a plane perpendicular to the common axis of said members, abut the rear face of the butt 2 of the tool-holding member and, as shown in Fig. 5, are formed at 15 actually arcuate around the axis of screw 14 so that the latter is relieved of the thrust-strain that would otherwise be imposed thereon in any of various angular positions of the tool-holding member.

Of course, to effect angular adjustment of the tool-holding member, the pivot screw being turned back so as to cease to clamp, one of the set-screws 13 is unscrewed to the required extent and the other screwed in until the tongue is clamped by the set-screws.

It is noted that the parts intervening between the bar portions 1 and 9 form a plain cylindrical body without projections or enlargements within itself which would involve danger in handling the implement when it is in operation.

Having thus fully described my invention what I claim is:

A boring implement including a shank member around whose longitudinal axis the implement is rotated, a tool-holding member coaxial with the shank member, one of the adjacent portions of said members having, extending away from the other such portion, an axial bore and, extending toward said other portion and on opposite sides of the bore, a pair of fork-forming projections and said other portion having a projection extending between the projections of said pair and into and free to undergo angular displacement in the bore, each two adjoining projections having planiform adjoining faces parallel with said axis and contacting each other, means to clamp all three projections together including a pivot-forming screw penetrating said faces and having its axis perpendicular to the first-named axis, and screws tapped into the first-named portion in perpendicular relation to the first-named screw beyond the latter relatively to, and bearing against opposite sides of the projection of, said other portion, the projections of said pair terminating each in a plane perpendicular to said axis and having their free-ends bearing against the second-named portion and formed arcuate around the second-named axis.

JOHN WANELIK.